(12) United States Patent
Schüssler et al.

(10) Patent No.: US 6,660,685 B1
(45) Date of Patent: Dec. 9, 2003

(54) DEVICE FOR CARRYING OUT A HETEROGENOUSLY CATALYSED REACTION AND METHOD FOR PRODUCING A CATALYST

(75) Inventors: Martin Schüssler, Ulm (DE); Tomas Stefanovski, Böblingen (DE); Detlef zur Megede, Kirchheim/Teck (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 0 days.

(21) Appl. No.: 09/509,949
(22) PCT Filed: Sep. 11, 1998
(86) PCT No.: PCT/EP98/05798
§ 371 (c)(1),
(2), (4) Date: Jun. 6, 2000
(87) PCT Pub. No.: WO99/17867
PCT Pub. Date: Apr. 15, 1999

(30) Foreign Application Priority Data

Oct. 2, 1997 (DE) .......................... 197 43 673

(51) Int. Cl.$^7$ ................................ B01J 23/72
(52) U.S. Cl. ...................................... 502/345
(58) Field of Search ................ 502/345; 428/304.4, 428/307.7, 403, 402.2, 469

(56) References Cited

U.S. PATENT DOCUMENTS 4,214,954 A * 7/1980 Kuo ..................... 204/32 R
6,517,805 B1 * 2/2003 Schuessler et al. ...... 423/648.1

* cited by examiner

Primary Examiner—Stuart L. Hendrickson
(74) Attorney, Agent, or Firm—Crowell & Moring LLP

(57) ABSTRACT

To carry out a heterogeneously catalysed reaction, a reaction mixture comprising hydrocarbon and water is fed onto a catalyst that is produced by compressing at least one catalyst powder into a highly compressed layer which forms a shaped body. The reaction mixture is pressed through the catalyst layer with a pressure drop.

8 Claims, 2 Drawing Sheets

DEVICE FOR CARRYING OUT A HETEROGENOUSLY CATALYSED REACTION AND METHOD FOR PRODUCING A CATALYST

BACKGROUND AND SUMMARY OF INVENTION

The present invention relates to a device for carrying out a heterogeneously catalysed reaction in which a suitable reaction mixture is fed onto a catalyst, and to a process for producing a catalyst which is suitable in particular for use in a device of this nature.

An example of a heterogeneously catalysed reaction is the generation of hydrogen from hydrocarbon or alcohol, in particular methanol (methanol reforming), in which a reaction mixture comprising hydrocarbon or alcohol and water is fed onto a catalyst. Further examples are the reduction of carbon monoxide levels so that carbon dioxide is liberated in a so-called hydrogen shift reaction, the oxidation of carbon monoxide in which a CO-containing gas and an $O_2$-containing gas are fed onto a catalyst and a combustible starting material is burnt with the addition of an $O_2$-containing gas in a catalytic burner.

Obtaining hydrogen from methanol is based on the overall reaction $CH_3OH+H_2O \rightarrow CO_2+3H_2$. In practice, to carry out this reaction a reaction mixture comprising the hydrocarbon and steam is guided past a suitable catalyst during heating, in order to produce the desired hydrogen in a two-stage or multistage reaction sequence. A two-stage methanol reforming device of this nature is known from EP 0,687,648 A1. In the known device, the reaction mixture is fed to a first reactor, in which only partial conversion of the methanol is desired. After it has flowed through the first reactor, the gas mixture, which still contains some unconverted starting materials, is guided to a second reactor which is constructed optimally for the residual conversion. The reactors are designed as plate or bed reactors in which the catalyst is provided in the form of a bed or a coating of the dispersion passages. Furthermore, catalysts in the form of coated metal sheets, lattices and foams through which the reaction mixture flows are known.

EP 0,217,532 B1 has disclosed a process for the catalytic generation of hydrogen from mixtures of methanol and oxygen using a gas-permeable catalyst system in which a hydrogen generator is provided with an upper reaction zone and a lower reaction zone, the reaction mixture of methanol and oxygen being fed into the upper reaction zone. After it has flowed through the upper reaction zone, the reaction mixture is guided into the lower reaction zone, in which, as a result of spontaneous initiation of the oxidation of the methanol, the temperature rises to such an extent that partial oxidation of the methanol begins in the upper reaction zone in the presence of a copper catalyst and hydrogen is formed.

Working on the basis of this prior art, the invention is based on the object of providing a device of the generic type which has as simple and compact a structure as possible and in which the amount of catalyst material required for the conversion of a specific mass flow of fuel is minimized. A further object of the invention is to specify a process for producing a catalyst which enables the said minimization of catalyst material and the simple and compact structure to be achieved.

To achieve this object, the invention proposes a device for carrying out a heterogeneously catalysed reaction. Consequently, the device according to the invention comprises a catalyst which is formed by compressing catalyst material into a thin, large-area layer, it being possible to press the reaction mixture through the catalyst with a pressure drop. In contrast to the known devices, such as hydrogen reactors and the like, the catalyst is not designed as a simple surface structure, around which the reaction mixture simply flows, but rather as a highly compressed three-dimensional layer through which the reaction mixture is pressed with considerable pressure applied. The result is a high utilization of the capacity of the active catalyst centres and a high reaction rate at the centres. Due to the considerable pressure drop while the reaction mixture passes through the catalyst layer according to the invention, the flow resistances to the supply and removal of the starting materials and products of the reaction do not play any major role, so that the supply and removal of the substances involved in the reaction can be of simple form. The considerable compression of the catalyst material produces a highly compact catalyst layer, with the result that the proportion of the total volume and weight of the reactor which is formed by the gas space and solids which are not catalytically active (such as for example metal support sheets and the like) is considerably reduced compared to known devices. Preferably, the catalytic material used is fine-grained catalyst granules or powder. In this way, good mass and heat transfer to and from the inner areas of the catalyst grains is ensured even at high reaction rates. Moreover, the proportion of pores through which the mixture can flow increases as the grain size decreases, i.e. the number of "blind alleys" for the gas flow decreases. Flowing through the layer imposes a high level of turbulence on the gases, with the result that the film diffusion resistances around the grains of the catalyst material are reduced, leading to improved heat transfer through convection.

In one configuration of the invention, the catalyst layer is arranged substantially at right angles to the direction of flow of the reaction mixture. The result is particularly short paths for the gas to flow through. Due to the large-area, highly compressed configuration of the catalyst layer according to the invention, in the event of the gases flowing at right angles, even a short distance is sufficient to achieve a high level of reaction with a high pressure drop.

In a particularly advantageous configuration of the invention, the catalyst material is compressed with a support structure, with the result that the catalyst material is mechanically stabilized and/or the conduction of heat is improved. The support structure is advantageously a three-dimensional lattice-like structure (matrix), which in a further advantageous configuration of the invention is a metallic support structure. The metal used is, for example, copper, in particular dendritic copper.

In an advantageous configuration of the invention, the catalyst material contains a precious metal, in particular platinum. The added precious metal, which is preferably platinum, although the use of other precious metals is also possible, reacts even at relatively low operating temperatures and thus serves to heat the catalyst arrangement. This measure significantly improves the cold-start performance of the catalyst arrangement, which is advantageous in particular for use in the mobile hydrogen generation sector.

In a particularly advantageous refinement of the invention, a plurality of layers which are connected in parallel are provided. This allows the total surface area through which the reaction mixture is to flow to be spread over a plurality of layers which are arranged one behind the other but are connected in parallel. This "modular design" results in a particularly compact structure of the catalyst arrangement.

To simplify the supply and removal of the substances involved in the reaction, in a further configuration of the invention passages for guiding starting materials of the reaction mixture and the reaction products are provided in the at least one catalyst layer.

In a further configuration of the invention, oxygen, which may promote or be required for the reaction, is fed to the reaction mixture only at the level of the at least one catalyst layer.

According to the invention, to produce a catalyst which can be used in particular in a hydrogen generation device according to the invention, a highly compressed layer which forms a shaped body is formed from at least one catalyst powder by compression, the catalyst powder comprising dendritic copper in powder form.

In one configuration of the invention, the shaped body is sintered following the compression, resulting in particularly high strength of the catalyst according to the invention.

In a further configuration of the invention, passages for guiding starting materials and products of the catalytic reaction are formed in the shaped body during compression. Advantageously, these passages are produced by the introduction of spacer elements which can be removed again in a subsequent process step. The spacer elements are advantageously removed by being burnt, pyrolysed, dissolved or vaporized.

In a further advantageous configuration of the invention, a further powder layer is pressed onto a ready-sintered shaped body and is then sintered. This allows a catalyst with a plurality of layers positioned one above the other to be produced in a type of sandwich structure in a multistage production process, which layers are connected in parallel by suitable passages being formed. As a result, the total catalyst volume through which the reaction mixture is to flow can be spread over a smaller cross-sectional area while nevertheless maintaining the concept of the high pressure drop over a short flow path.

BRIEF DESCRIPTION OF THE DRAWINGS

The invention is diagrammatically illustrated with reference to exemplary embodiments in the drawing and is described in detail below with reference to the drawing, in which.

DETAILED DESCRIPTION OF THE DRAWINGS

Figure 1:
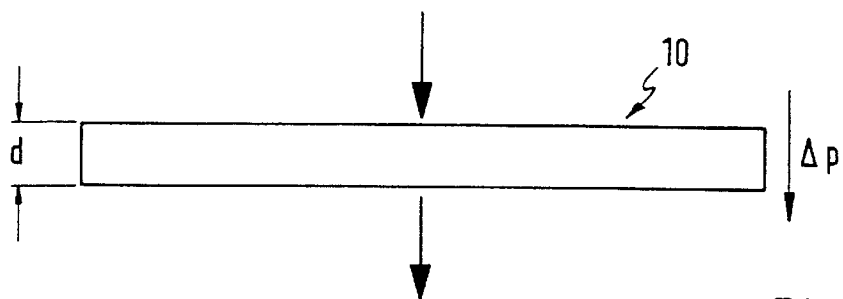
FIG. 1 shows a highly diagrammatic illustration of the way in which a catalyst layer according to the invention functions.

FIG. 1 shows a diagrammatic side view of a catalyst layer 10 according to the invention which is formed by compression of catalyst material to form a thin, large-area, highly compressed layer. The layer 10 forms a shaped body with a thickness d which is, for example, 1 mm. The catalyst material used is a fine-grained catalyst powder or granules, the grains of which have a diameter of approx. 0.5 mm or less. The compression takes place, for example, at temperatures of approx. 200° C. to 500° C.

The catalyst layer 10 illustrated forms part of a hydrogen generation device (not shown in more detail) in which the starting materials of the reaction mixture are fed onto the catalyst layer 10 under pressure, substantially at right angles to the said layer, and are pressed through the said layer. As it flows through the catalyst layer 10, the reaction mixture undergoes a pressure drop $\Delta p$ of approx. 100 mbar or more (for example 1 to 4 bar). On the opposite side of the catalyst layer 10, the catalytic reaction products emerge in the direction indicated by the arrow.

To make the catalyst material more mechanically stable and/or thermally conductive, the catalyst material is pressed into a support structure. This support structure is a lattice-like matrix which is obtained by mixing the at least one catalyst powder with dendritic copper in powder form and by compressing this mixture. During compression, the dendritic copper forms a lattice-like matrix structure in which the catalyst grains are "incorporated". Even with a relatively low copper powder content by mass relative to the total mass of the layer, the dendritic copper powder can easily be pressed together or sintered to form a lattice, has a large surface area and is itself catalytically active. Therefore, the use of dendritic copper powder produces a stabilizing, fixing and heat-distributing lattice in the micrometer range.

Figure 2:
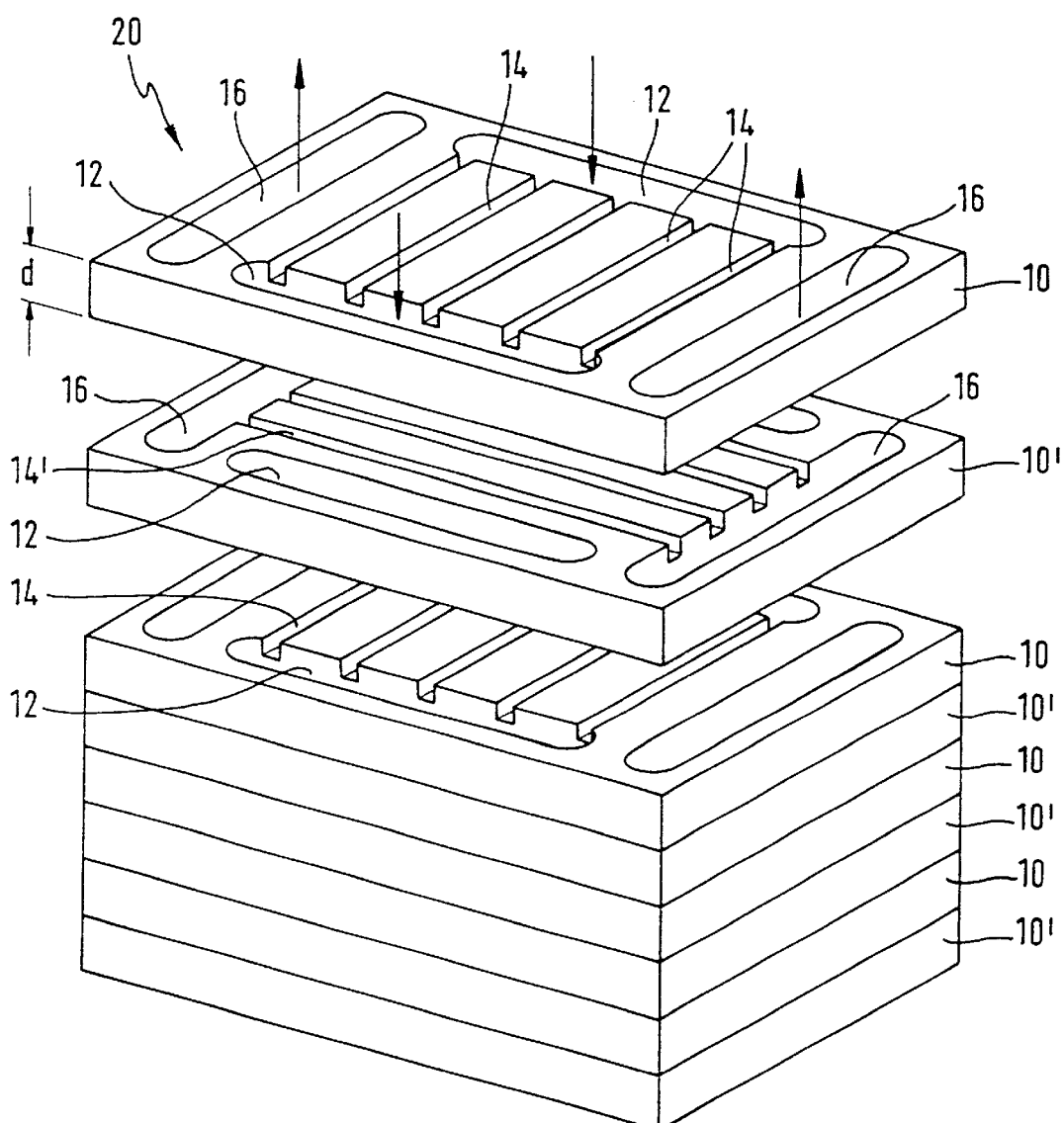
FIG. 2 shows a perspective illustration of a stacked arrangement, according to the invention, of catalyst layers connected in parallel.

The catalyst layer 10 has a relatively large surface area of, for example, 100 cm². To achieve a more compact structure, the catalyst volume through which the reaction mixture is to flow is spread over a plurality of layers which, however, are arranged not next to one another, but rather one behind the other, but in parallel. An arrangement of this type is illustrated in FIG. 2, which shows a stack 20 comprising a large number of catalyst layers 10, 10' resting on top of one another, the layers which are located at the top in the drawing being illustrated spaced apart from one another in order for the way in which the catalyst operates to be made clearer.

The catalyst layers 10 have passages 12, 14, 14' 16 for guiding starting materials and products of the catalytic reaction. In the exemplary embodiment illustrated in FIG. 2, starting-material passages 12 which run substantially parallel to the longitudinal edges and form guide passages which run continuously at right angles to the surface plane of the catalyst layer are provided in the catalyst layer, the starting-material passages 12 of catalyst layers 10, 10' which lie above one another being arranged substantially congruently with respect to one another and thus forming a guide passage, which runs continuously through the entire stack 20 from the top downwards, for the starting materials of the reaction mixture. Depending on the use of the stack arrangement, a specific reaction mixture is guided through the starting-material passages 12. If it is being used as a hydrogen reactor, the reaction mixture comprises alcohol, in particular methanol, and chemically bonded hydrogen, advantageously in the form of water. If the stack 20 is being used in a so-called $H_2$ shift reaction to reduce the levels of carbon monoxide while releasing carbon dioxide, the reaction mixture comprises carbon monoxide and hydrogen. If it is being used in the carbon monoxide oxidation sector, the reaction mixture comprises a CO-containing gas and an $O_2$-containing gas. If the catalyst stack 20 is being used in a catalytic burner, the reaction mixture comprises a combustible starting material and an $O_2$-containing gas.

The starting-material passages 12 of every second catalyst layer 10 are in communication with distribution passages 14 which run substantially parallel to the surface of the catalyst layer 10 and divert at least part of the reaction mixture entering through the starting-material passages 12 into the interior of the catalyst layer 10.

Consequently, according to the invention, part of the reaction mixture which enters through the starting-material passages 12 and is guided through the stack 20, in every second layer plane, is diverted into the interior of the two adjoining catalyst layers 10, 10' through the distribution passages 14, with the result that the catalyst layers which are arranged above one another are connected in parallel.

In the exemplary embodiment illustrated in FIG. 2, as described two separate starting-material passages 12 are provided per catalyst layer 10, 10'. This fact can be utilized to supply different substances in the reaction mixture separately from one another, so that individual constituents of the reaction mixture are only brought together in the plane of the catalyst layer 10.

Figure 3:
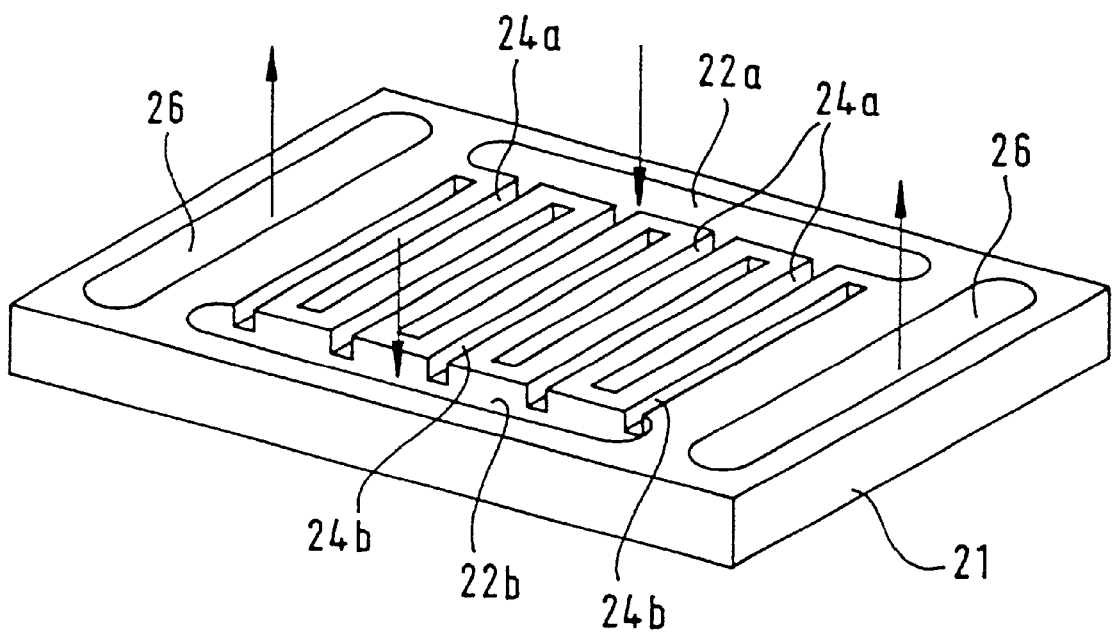
FIG. 3 shows a perspective illustration of the further exemplary embodiment of a single catalyst layer according to the invention.

For this purpose, it is advantageous to employ a catalyst layer having a passage structure such as that which is illustrated in the exemplary embodiment shown in FIG. 3. The catalyst layer 21 shown in FIG. 3 has starting-material passages 22a, 22b and product passages 26, the function of which in principle corresponds to the starting-material passages 12 and product passages 16 described in connection with FIG. 2. A difference from the catalyst layer 10 illustrated in FIG. 2 is that the two starting-material passages 22a, 22b which are arranged separately from one another are not in communication with one another via the dispersion passages, but rather the dispersion passages 24a and 24b which start from each of the starting-material passages 22a, 22b, respectively, extend transversely over the catalyst layer 21 but end before they reach the opposite starting-material passage 22b or 22a. The result is an arrangement of alternately linked passages, which can be utilized for the separate supply of a (further) gas which is required for or assists with the reaction. If, in the example of the methanol reformer, a mixture of methanol and steam is fed through one starting-material passage, for example the starting-material passage 22a, oxygen (air) can be supplied through the other starting-material passage 22b. The substances supplied are distributed in the catalyst layer 12 by way of the dispersion passages 24a, 24b assigned to the corresponding starting-material passage and only come into contact with one another in the layer itself. The result is a particularly homogeneous and safe (explosion risk) dispersion and mixing of the starting materials. Of course, embodiments other than those illustrated, with only one starting-material passage or even more than two starting-material passages, are also possible.

Product passages 16, which are of similar design to the starting-material passages 12, are arranged along the transverse edges of the catalyst layers 10, 10', which product passages likewise form guide passages which run substantially at right angles to the surface of each catalyst layer 10 and, when the catalyst layers 10 have been laid on top of one another, are in each case positioned congruently with respect to the product passages of the catalyst layer 10, 10' arranged above or below. The product passages 16 of each second catalyst layer 10' are in communication with collector passages 14', which collect the reaction product emerging from the catalyst layer 10, 10' arranged above and below and supply this product in the transverse direction to the product passages 16, by means of which the reaction products are removed through the stack 20.

In the embodiment illustrated of a device according to the invention for carrying out a heterogeneously catalysed reaction such as the generation of hydrogen, the catalyst layers 10, 10' which have been laid on top of one another therefore have alternating ways of functioning; the starting materials which are supplied through the starting-material passages 12 are distributed in the catalyst layers 10 and distributed over the surface of the catalyst layer located above and below by means of dispersion passages 14, and flow through this layer substantially at right angles and with a considerable pressure drop. In the following catalyst layer 10', the products of the catalytic reaction are collected in collector passages 14' and are fed to the product passages 16 in order for the reaction products to be removed from the catalyst stack 20.

Naturally, the invention is not limited to the embodiment illustrated and described. Rather, embodiments in which each catalyst layer is responsible for supplying, distributing, collecting and removing the starting materials or products are also conceivable. More complex catalyst layers of this nature may, for example, be produced by pressing and sintering pulverant catalyst material onto catalyst layers which have already been sintered.

Therefore, the invention provides catalyst layers which can be produced easily and in compact form and are suitable for use in hydrogen reactors for the catalytic generation of hydrogen, hydrogen shift stages for reducing the levels of CO, carbon monoxide oxidation reactors and catalytic burners. The design of the catalyst according to the invention enables a modular structure to be used, in which there are only low thermal losses and no temperature gradients, making it possible to achieve a reaction which proceeds homogeneously over a large volume. The entire volume of the catalyst is physically acceptable to starting materials, leading to considerably improved starting dynamics. Furthermore, the risk of ignition in the homogeneous combustion of methanol or the hydrogen-oxygen reaction is avoided.

By suitably selecting the process parameters (compression pressure, temperature, type and condition of the starting materials, such as particle size distribution, porosity, etc.), it is possible for the person skilled in the art to produce a catalyst layer arrangement or catalyst layer according to the invention which is tailored to the particular requirements and is optimized with regard to layer sequence, heat distribution, flow conditions and mechanical properties such as pressure drop and stability.

What is claimed is:

1. A process for producing a catalyst layer for carrying out a heterogeneously catalysed reaction, comprising:
   compressing at least one catalyst that contains dendritic copper in powder form, thereby forming a compressed layer that forms a shaped body,
   wherein, in the compressed layer, the dendritic copper forms a lattice support structure for the catalyst material.

2. A process according to claim 1, further comprising sintering the shaped body.

3. A process according to claim 1, further comprising forming passages in the shaped body during the compressing step for guiding starting materials and products of the catalysed reaction.

4. A process according to claim 3, wherein said passages are formed by introducing spacer elements into the shaped body and subsequently removing the spacer elements from the shaped body.

5. A process according to claim 4, wherein the removing of the spacer elements is by burning, pyrolyzing, dissolving, or vaporizing.

6. Process according to claim 2, further comprising pressing a powder layer onto the sintered shaped body and then sintering the powder layer.

7. A process according to claim 1, in which the catalyst material comprises a precious metal.

8. A process according to claim 4, wherein said metal is platinum.

* * * * *